United States Patent
Kunkel et al.

(10) Patent No.: US 9,230,594 B2
(45) Date of Patent: *Jan. 5, 2016

(54) RESISTANCE TEMPERATURE SENSORS FOR HEAD-MEDIA AND ASPERITY DETECTION

(71) Applicant: Seagate Technology LLC, Cupertino, CA (US)

(72) Inventors: Gary Joseph Kunkel, Minneapolis, MN (US); Huazhou Lou, Eden Prairie, MN (US); Declan Macken, Prior Lake, MN (US); Timothy William Stoebe, Minnetonka, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/287,419

(22) Filed: May 27, 2014

(65) Prior Publication Data
US 2014/0268410 A1   Sep. 18, 2014

Related U.S. Application Data

(62) Division of application No. 13/299,094, filed on Nov. 17, 2011, now Pat. No. 8,737,009.

(60) Provisional application No. 61/414,733, filed on Nov. 17, 2010, provisional application No. 61/414,734, filed on Nov. 17, 2010.

(51) Int. Cl.
*G11B 21/02* (2006.01)
*G11B 20/10* (2006.01)
*G11B 5/60* (2006.01)

(52) U.S. Cl.
CPC ............... *G11B 20/10* (2013.01); *G11B 5/607* (2013.01); *G11B 5/6011* (2013.01); *G11B 5/6076* (2013.01)

(58) Field of Classification Search
USPC .................................. 369/75, 59, 55
See application file for complete search history.

(56) References Cited

U.S. PATENT DOCUMENTS

| | | | |
|---|---|---|---|
| 5,025,341 A | 6/1991 | Bousquet et al. | |
| 5,080,495 A | 1/1992 | Hashimoto et al. | |

(Continued)

FOREIGN PATENT DOCUMENTS

| | | |
|---|---|---|
| EP | 0752700 | 1/1997 |
| EP | 1850333 | 10/2007 |

(Continued)

OTHER PUBLICATIONS

Thin Film Thermocouple Sensor for measurement of Contact Temperatures Using Slider Asperity Interaction on Magnetic Recording Disk, Schreck et al, IEEE Transactions on Magnetics, vol. 28, No. 5, Sep. 1992.*

(Continued)

*Primary Examiner* — Tan X Dinh
(74) *Attorney, Agent, or Firm* — Hollingsworth Davis, LLC (57) ABSTRACT

A temperature sensor of a head transducer measures temperature near or at the close point. The measured temperature varies in response to changes in spacing between the head transducer and a magnetic recording medium. A detector is coupled to the temperature sensor and is configured to detect a change in a DC component of the measured temperature indicative of onset of contact between the head transducer and the medium. Another head transducer configuration includes a sensor having a sensing element with a high temperature coefficient of resistance to interact with asperities of the medium. Electrically conductive leads are connected to the sensing element and have a low temperature coefficient of resistance relative to that of the sensing element, such thermally induced resistance changes in the leads have a negligible effect on a response of the sensing element to contact with the asperities.

22 Claims, 10 Drawing Sheets

(56) References Cited

U.S. PATENT DOCUMENTS

| | | |
|---|---|---|
| 5,561,896 A | 10/1996 | Voegeli et al. |
| 5,576,745 A | 11/1996 | Matsubara |
| 5,646,805 A | 7/1997 | Shen et al. |
| 5,689,292 A | 11/1997 | Suzuki et al. |
| 5,691,867 A | 11/1997 | Onuma et al. |
| 5,792,569 A | 8/1998 | Sun et al. |
| 5,901,001 A | 5/1999 | Meyer |
| 5,991,113 A | 11/1999 | Meyer et al. |
| 6,019,503 A | 2/2000 | Abraham et al. |
| 6,024,430 A | 2/2000 | Koitabashi et al. |
| 6,052,243 A | 4/2000 | Shimada |
| 6,052,249 A | 4/2000 | Abraham |
| 6,071,007 A | 6/2000 | Schaenzer |
| 6,125,008 A | 9/2000 | Berg |
| 6,178,157 B1 | 1/2001 | Berg |
| 6,181,520 B1 | 1/2001 | Fukuda |
| 6,262,572 B1 | 7/2001 | Franco et al. |
| 6,262,858 B1 | 7/2001 | Sugiyama et al. |
| 6,265,869 B1 | 7/2001 | Takahashi |
| 6,311,551 B1 | 11/2001 | Boutaghou et al. |
| 6,338,899 B1 | 1/2002 | Fukuzawa et al. |
| 6,359,746 B1 | 3/2002 | Kakekado |
| 6,366,416 B1 | 4/2002 | Meyer |
| 6,377,422 B1 | 4/2002 | Boutaghou et al. |
| 6,501,606 B2 | 12/2002 | Boutaghou |
| 6,552,880 B1 | 4/2003 | Dunbar |
| 6,577,466 B2 | 6/2003 | Meyer |
| 6,594,104 B2 | 7/2003 | Tokuyama et al. |
| 6,600,622 B1 | 7/2003 | Smith |
| 6,603,619 B1 | 8/2003 | Kojima et al. |
| 6,662,623 B2 | 12/2003 | Baumgartner |
| 6,666,076 B2 | 12/2003 | Lin |
| 6,671,133 B1 | 12/2003 | Sasaki et al. |
| 6,692,848 B2 | 2/2004 | Ohtani |
| 6,697,223 B2 | 2/2004 | Lewis |
| 6,700,724 B2 | 3/2004 | Riddering |
| 6,771,453 B2 | 8/2004 | Baumgartner |
| 6,776,176 B1 | 8/2004 | Kino |
| 6,785,081 B2 | 8/2004 | Chapin |
| 6,788,500 B2 | 9/2004 | Baril et al. |
| 6,899,456 B2 | 5/2005 | Sundaram et al. |
| 6,958,871 B2 | 10/2005 | Hirano |
| 6,967,805 B1 | 11/2005 | Hanchi et al. |
| 7,006,336 B2 | 2/2006 | Coffey et al. |
| 7,042,674 B1 * | 5/2006 | Baril et al. .......................... 360/75 |
| 7,064,659 B2 | 6/2006 | Baumgartner |
| 7,068,457 B2 | 6/2006 | Riddering |
| 7,092,195 B1 | 8/2006 | Liu et al. |
| 7,099,096 B2 | 8/2006 | Ueyanagi |
| 7,130,141 B2 | 10/2006 | Chey et al. |
| 7,180,692 B1 | 2/2007 | Che |
| 7,190,543 B2 | 3/2007 | Suk |
| 7,194,802 B2 | 3/2007 | Fayeulle |
| 7,199,960 B1 | 4/2007 | Schreck |
| 7,233,451 B2 | 6/2007 | Baumgart |
| 7,262,936 B2 | 8/2007 | Hamann et al. |
| 7,265,922 B2 | 9/2007 | Biskeborn et al. |
| 7,278,902 B1 | 10/2007 | Kurita |
| 7,310,197 B2 | 12/2007 | Baumgart |
| 7,310,198 B2 | 12/2007 | Baumgart |
| 7,312,941 B2 | 12/2007 | Hirano |
| 7,362,535 B2 | 4/2008 | Kumano |
| 7,365,931 B2 | 4/2008 | Ikai |
| 7,371,708 B2 | 5/2008 | Arai et al. |
| 7,372,665 B1 | 5/2008 | Stoev et al. |
| 7,411,752 B2 | 8/2008 | Angelo |
| 7,417,820 B2 | 8/2008 | Otsuki et al. |
| 7,450,333 B2 | 11/2008 | Hirano |
| 7,477,470 B2 | 1/2009 | Leis et al. |
| 7,502,205 B1 | 3/2009 | Hurtado et al. |
| 7,508,612 B2 | 3/2009 | Biskeborn et al. |
| 7,518,818 B2 | 4/2009 | Yamazaki et al. |
| 7,561,368 B2 | 7/2009 | Kim et al. |
| 7,564,649 B2 | 7/2009 | Hanchi et al. |
| 7,593,187 B2 | 9/2009 | Aoki |
| 7,595,960 B2 | 9/2009 | Shimizu et al. |
| 7,616,398 B2 | 11/2009 | Gong |
| 7,623,322 B2 | 11/2009 | Umehara et al. |
| 7,626,144 B2 | 12/2009 | Merzliakov |
| 7,649,714 B2 | 1/2010 | Kato et al. |
| 7,692,888 B2 | 4/2010 | Duan |
| 7,692,898 B2 | 4/2010 | Hattori |
| 7,706,109 B2 | 4/2010 | Nichols et al. |
| 7,724,480 B1 | 5/2010 | Guo |
| 7,729,079 B1 | 6/2010 | Huber |
| 7,729,087 B1 | 6/2010 | Stoev et al. |
| 7,742,255 B2 | 6/2010 | Daugela |
| 7,760,457 B1 | 7/2010 | Gunderson |
| 7,773,346 B1 | 8/2010 | Guo |
| 7,787,201 B2 | 8/2010 | Alex |
| 7,787,207 B2 | 8/2010 | Takahashi |
| 7,796,356 B1 * | 9/2010 | Fowler et al. ..................... 360/75 |
| 7,800,858 B1 * | 9/2010 | Bajikar et al. .................... 360/75 |
| 7,804,657 B1 | 9/2010 | Hogg et al. |
| 7,864,474 B2 | 1/2011 | Satoh et al. |
| 7,872,824 B1 | 1/2011 | Macchioni et al. |
| 7,903,365 B2 | 3/2011 | Watanabe |
| 7,929,249 B2 | 4/2011 | Seigler |
| 7,929,256 B2 | 4/2011 | Yamashita et al. |
| 8,049,984 B2 | 11/2011 | Contreras |
| 8,098,450 B2 | 1/2012 | Baumgart et al. |
| 8,144,412 B2 | 3/2012 | Kiyono |
| 8,149,541 B2 | 4/2012 | Baumgart |
| 8,199,431 B2 | 6/2012 | Kanaya et al. |
| 8,248,737 B2 | 8/2012 | Chen |
| 8,279,557 B2 | 10/2012 | Kautzky |
| 8,297,113 B2 | 10/2012 | Liners et al. |
| 8,310,779 B2 | 11/2012 | Hanchi |
| 8,335,053 B2 | 12/2012 | Chen |
| 8,523,312 B2 | 9/2013 | Zheng et al. |
| 8,737,009 B2 | 5/2014 | Kunkel et al. |
| 8,804,263 B1 | 8/2014 | Contreras et al. |
| 2002/0039264 A1 | 4/2002 | Ohsawa et al. |
| 2002/0056313 A1 | 5/2002 | Wakefield |
| 2002/0071196 A1 | 6/2002 | Chapin |
| 2002/0071215 A1 | 6/2002 | Lewis |
| 2002/0093753 A1 | 7/2002 | Atsumi |
| 2002/0118485 A1 | 8/2002 | Tokuyama et al. |
| 2003/0002183 A1 | 1/2003 | Fioravanti |
| 2003/0043491 A1 | 3/2003 | Riddering |
| 2003/0043497 A1 | 3/2003 | Riddering |
| 2003/0051529 A1 | 3/2003 | Baumgartner |
| 2003/0058559 A1 | 3/2003 | Brand |
| 2003/0086197 A1 | 5/2003 | Baumgartner |
| 2003/0206361 A1 | 11/2003 | Baril et al. |
| 2004/0027728 A1 | 2/2004 | Coffey et al. |
| 2004/0085670 A1 | 5/2004 | Li et al. |
| 2004/0190175 A1 | 9/2004 | Chey et al. |
| 2004/0240109 A1 | 12/2004 | Hamann et al. |
| 2005/0057833 A1 | 3/2005 | Hirano |
| 2005/0057834 A1 | 3/2005 | Hirano |
| 2005/0174665 A1 | 8/2005 | Zhang |
| 2005/0176582 A1 | 8/2005 | Arai et al. |
| 2005/0190496 A1 | 9/2005 | Hamann et al. |
| 2006/0034013 A1 | 2/2006 | Kato et al. |
| 2006/0119974 A1 | 6/2006 | Yamazaki et al. |
| 2006/0285243 A1 | 12/2006 | Baumgart |
| 2007/0019325 A1 | 1/2007 | Shimizu et al. |
| 2007/0091512 A1 | 4/2007 | Nichols et al. |
| 2007/0097536 A1 | 5/2007 | Biskeborn et al. |
| 2007/0133118 A1 | 6/2007 | Kajitani |
| 2007/0201154 A1 | 8/2007 | Ozeki |
| 2007/0206654 A1 | 9/2007 | Merzliakov |
| 2007/0242382 A1 | 10/2007 | Biskeborn et al. |
| 2008/0080086 A1 | 4/2008 | Che |
| 2008/0100965 A1 | 5/2008 | Oki |
| 2008/0130152 A1 | 6/2008 | Kameyama |
| 2008/0137225 A1 | 6/2008 | Duan |
| 2008/0145709 A1 | 6/2008 | Yamashita et al. |
| 2008/0218909 A1 | 9/2008 | Kurihara |
| 2008/0225426 A1 | 9/2008 | Roy et al. |
| 2008/0225427 A1 | 9/2008 | Liu |
| 2008/0239581 A1 | 10/2008 | Ikai et al. |
| 2008/0247078 A1 | 10/2008 | Yao |

(56) References Cited

U.S. PATENT DOCUMENTS

| | | |
|---|---|---|
| 2008/0247079 A1 | 10/2008 | Satoh et al. |
| 2008/0247080 A1 | 10/2008 | Kim et al. |
| 2008/0259480 A1 | 10/2008 | Pham |
| 2008/0291579 A1 | 11/2008 | Uesugi et al. |
| 2009/0021867 A1 | 1/2009 | Kondo |
| 2009/0122435 A1 | 5/2009 | Takahashi |
| 2009/0153995 A1 | 6/2009 | Jang |
| 2009/0190260 A1 | 7/2009 | Kobatake |
| 2009/0262460 A1 | 10/2009 | Hanchi |
| 2010/0007976 A1 | 1/2010 | Baumgart |
| 2010/0020439 A1 | 1/2010 | Watanabe |
| 2010/0053815 A1 | 3/2010 | Komoriya |
| 2010/0097721 A1 | 4/2010 | Baumgart |
| 2010/0142096 A1 | 6/2010 | Contreras |
| 2010/0149696 A1 | 6/2010 | Chen |
| 2010/0157477 A1 | 6/2010 | Morinaga |
| 2010/0182723 A1* | 7/2010 | Yanagisawa ............. 360/324.12 |
| 2010/0232067 A1 | 9/2010 | Liners et al. |
| 2010/0284102 A1 | 11/2010 | Gubbins et al. |
| 2011/0032642 A1 | 2/2011 | Kautzky |
| 2011/0096440 A1 | 4/2011 | Greminger |
| 2011/0122533 A1 | 5/2011 | Kiyono |
| 2011/0157740 A1 | 6/2011 | Baumgart et al. |
| 2011/0235207 A1* | 9/2011 | Yang ............................... 360/75 |
| 2011/0235208 A1 | 9/2011 | Yang |
| 2011/0249363 A1 | 10/2011 | Kanaya et al. |
| 2012/0099218 A1 | 4/2012 | Kurita |
| 2012/0105999 A1 | 5/2012 | Chen |
| 2012/0120519 A1 | 5/2012 | Kunkel et al. |
| 2012/0120521 A1 | 5/2012 | Kurita |
| 2012/0120522 A1 | 5/2012 | Johnson et al. |
| 2012/0120527 A1 | 5/2012 | Kunkel et al. |
| 2012/0120528 A1 | 5/2012 | Furukawa |
| 2012/0120982 A1* | 5/2012 | Anaya-Dufresne et al. .. 374/141 |
| 2012/0201108 A1* | 8/2012 | Zheng et al. ................ 369/13.26 |
| 2013/0250446 A1 | 9/2013 | Zeng et al. |
| 2013/0250455 A1 | 9/2013 | Zeng et al. |
| 2013/0286802 A1 | 10/2013 | Kiely |
| 2013/0286805 A1 | 10/2013 | Macken et al. |
| 2014/0009851 A1 | 1/2014 | Budde |
| 2014/0023108 A1 | 1/2014 | Johnson et al. |
| 2014/0029402 A1 | 1/2014 | Zheng et al. |
| 2014/0269819 A1 | 9/2014 | Kiely et al. |
| 2014/0269838 A1 | 9/2014 | Macken |
| 2015/0062754 A1 | 3/2015 | Peng et al. |

FOREIGN PATENT DOCUMENTS

| | | |
|---|---|---|
| JP | 06168421 | 6/1994 |
| JP | 07114717 | 5/1995 |
| JP | 10049927 | 2/1998 |
| JP | 11339414 | 12/1999 |
| JP | 20030297029 | 10/2003 |
| JP | 2004335069 | 11/2004 |
| JP | 2007234093 | 9/2007 |
| JP | 2008097760 | 4/2008 |
| JP | 2008112545 | 5/2008 |
| JP | 2008186549 | 8/2008 |
| JP | 2009129532 | 6/2009 |
| KR | 1020110108181 | 10/2011 |
| WO | WO2012068399 | 5/2012 |

OTHER PUBLICATIONS

File History for U.S. Appl. No. 13/299,082.
File History for U.S. Appl. No. 13/299,094.
File History for U.S. Appl. No. 13/299,139.
File History for U.S. Appl. No. 12/941,461.
International Search Report and Written Opinion dated Feb. 28, 2012 for PCT Application No. PCT/US2011/061233, 12 pages.
International Search Report and Written Opinion dated Feb. 28, 2012 for PCT Application No. PCT/US2011/061236, 11 pages.
International Preliminary Report on Patentability dated May 30, 2013 for PCT Application No. PCT/US2011/061233, 8 pages.
International Preliminary Report on Patentability dated May 30, 2013 for PCT Application No. PCT/US2011/061236, 7 pages.
Korean Office Action with translation dated Jan. 20, 2014 for KR Application No. 10-2012-0130952, 11 pages.
File History for U.S. Appl. No. 14/016,645.
Office Action dated Nov. 4, 2014 for JP Application No. 2013-540023, 2 pages.
www.allaboutcircuits.com, "Kirchhoff's Voltage Law (KVL): Divider Circuits and Kirchhoff's Laws," Jul. 14, 2014, 12 pages.
File History for U.S. Appl. No. 14/457,694.
File History for U.S. Appl. No. 14/457,678.
File History for U.S. Appl. No. 14/287,412.
File History for U.S. Appl. No. 13/298,712.
Office Action dated Nov. 25, 2014 for JP Application No. 2013-136342, 4 pages.
European Search Report dated Mar. 4, 2013 for EP Application No. 12192502.8, 6 pages.
File History for U.S. Appl. No. 14/720,299.

* cited by examiner

| | SLOPE, dR/dT | R AT 300K | TCR, %/K | ppm/K |
|---|---|---|---|---|
| MEASUREMENT-1 | 5.13E-06 | 2.028 | 2.53E-04 | 2.53 |
| MEASUREMENT-2 | -3.05E-05 | 2.025 | -1.51E-03 | -15.10 |
| MEASUREMENT-3 | -2.78E-05 | 2.025 | -1.37E-03 | -13.70 |
| | | | | |
| LITERATURE BULK VALUE(REF: J. O'MALLEY 1992, WIKIPEDIA) | | | | |
| TCR AT 20C | 8 ppm/K | | | |
| TCR -55 TO 105C | ±40 ppm/K | | | |

RESISTANCE TEMPERATURE SENSORS FOR HEAD-MEDIA AND ASPERITY DETECTION

RELATED PATENT DOCUMENTS

This application is a divisional of U.S. Ser. No. 13/299,094, filed Nov. 17, 2011, and claims the benefit of Provisional Patent Application Ser. Nos. 61/414,733 and 61/414,734 both filed on Nov. 17, 2010, to which priority is claimed pursuant to 35 U.S.C. §119(e) and which are hereby incorporated herein by reference in their respective entirety.

SUMMARY

Embodiments of the disclosure are directed to an apparatus for detecting head-media contact which includes a head transducer and a temperature sensor situated near or at a close point of the head transducer and configured to measure temperature near or at the close point. The measured temperature varies in response to changes in spacing between the head transducer and a magnetic recording medium. A detector is coupled to the temperature sensor and is configured to detect a change in a DC component of the measured temperature indicative of onset of contact between the head transducer and the medium.

According to other embodiments, a method for detecting head-media contact involves measuring, with a magnetic recording medium moving relative to a head transducer, a temperature at a head-to-disk interface, the measured temperature varying in response to changes in spacing between the head transducer and the medium. The method also involves detecting a change in a DC component of the measured temperature indicative of onset of contact between the head transducer and the medium.

Accordance to various embodiments, an apparatus includes a head transducer and a sensor situated on the head transducer to interact with asperities of a magnetic recording medium. The sensor includes a sensing element having a high temperature coefficient of resistance. Electrically conductive leads are connected to the sensing element. The leads have a low temperature coefficient of resistance relative to that of the sensing element, such thermally induced resistance changes in the leads have a negligible effect on a response of the sensing element to asperities.

In accordance with further embodiments, a method involves moving a magnetic recording medium relative to a head transducer and sensing for asperities of the medium using a sensor comprising a sensing element having a high temperature coefficient of resistance coupled to electrically conductive leads having a low temperature coefficient of resistance relative to that of the sensing element such that thermally induced resistance changes in the leads have a negligible effect on a response of the sensing element to asperities.

These and other features and aspects of various embodiments may be understood in view of the following detailed discussion and accompanying drawings.

DETAILED DESCRIPTION

Data storage systems commonly include one or more recording heads that read and write information to a recording medium. It is often desirable to have a relatively small distance or spacing between a recording head and its associated media. This distance or spacing is known as "fly height" or "head-media spacing." By reducing the head-media spacing, a recording head is typically better able to both write and read data to and from a medium. Reducing the head-media spacing also allows for surveying of recording medium topography, such as for detecting asperities and other features of the recording medium surface.

Recording head transducers are typically set to the lowest reliable spacing from the media to achieve the highest recording density. Head-media contact detection is critical in setting such low head-media spacing. Some conventional systems use head off-track motion due to contact friction at large skew angle to measure head-media contact. Such systems only work at inner and outer radii of the media surface, and do not have the capability to measure head-media contact at all locations of the media surface.

Other conventional approaches use head-disk modulation to detect contact by either using the reader or additional sensors, such as thermal sensors, on the head transducer. However, modulation degrades data recording system, and future recording systems will have to eliminate modulation to achieve lower magnetic spacing and higher areal density. Presently, no conventional system can detect head-media contact of a non-modulation interface across the entire media surface in a drive.

Embodiments of the disclosure are directed to a head transducer equipped with a temperature sensor situated at or near the close point of the head transducer. The close point is generally understood to be the closest point of contact between the head transducer and a magnetic recording medium. Embodiments are directed to implementations that use the temperature sensor bias power and/or thermal actuator power to heat the temperature sensor to be substantially hotter than the recording medium (e.g., by between about 100° C. and 300° C. hotter, with a preferred range between about 150° C. and 250° C. hotter, and a more preferred range between about 150° C. and 200° C. hotter). Embodiments use media cooling at the onset of head-media contact to generate a temperature excursion due to a sudden change in heat transfer rate resulting from the contact event. The temperature excursion measured by the temperature sensor is used to detect head-media contact at any location of the media (i.e., not limited to inner and outer radii).

According to various embodiments, a head-to-disk interface (HDI) is implemented to have no modulation during head-media contact. The head transducer surface temperature at the interface is preferably raised to be substantially higher than the media temperature by using bias power to the resistance temperature sensor and/or the thermal actuator in the head transducer. The media is used as a heat sink to cool down the head transducer at the onset of the head-media contact to generate a DC shift in head transducer temperature. According to other embodiments, the head transducer surface temperature at the interface can be lowered to be substantially lower than the media temperature by lowering the bias power to the resistance temperature sensor and/or using a non-thermal actuator in the head transducer. This approach may provide for improved frictional heating detection, which can be used to declare head-media contact. The resistance temperature sensor at the close point of the head transducer measures the DC temperature change since the non-modulating interface generates a predominately DC signal.

When the head transducer comes into contact with the media, the heat transfer rate will have a sudden increase due to direct contact of the high thermal conductivity materials of the head transducer and the media. The sudden change of heat transfer rate at the onset of head-media contact causes an excursion of the head transducer temperature at the head-to-disk interface. This DC temperature excursion is used to detect head-media contact.

Figure 1:
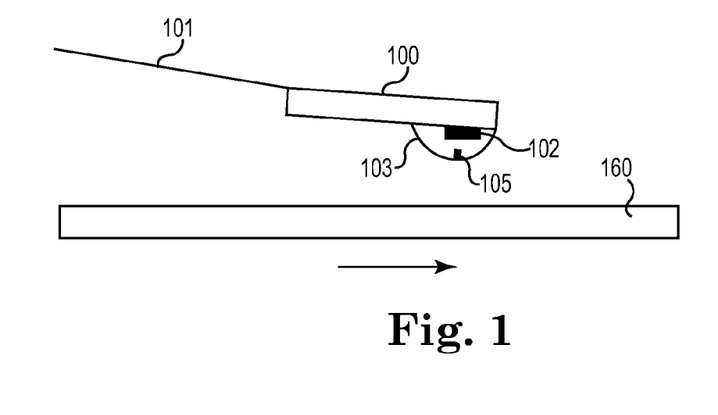
FIG. 1 is a simplified side view of a heater-actuated head transducer arrangement which incorporates a temperature sensor in accordance with various embodiments.
Figure 2:
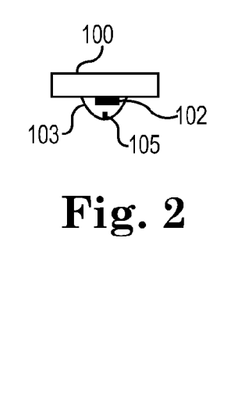
FIG. 2 is a front view of the heater-actuated head transducer arrangement shown in FIG. 1.
Figure 3:
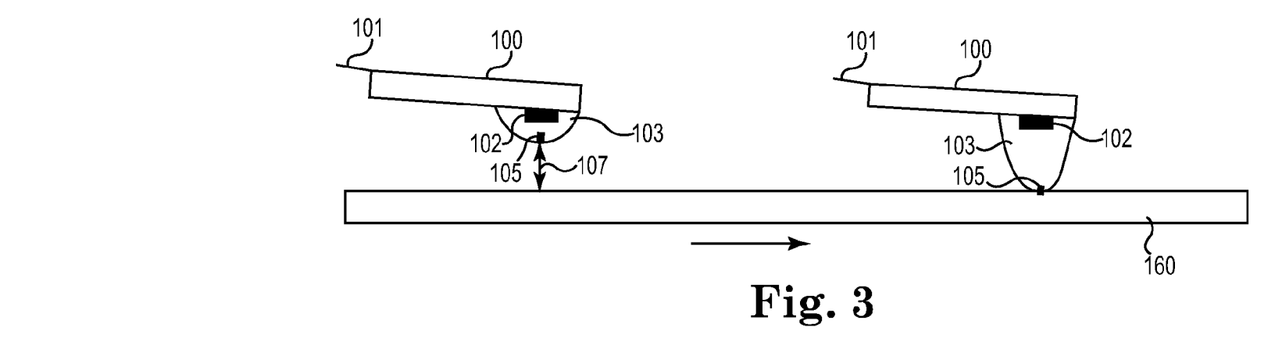
FIG. 3 shows the heater-actuated head transducer arrangement of FIGS. 1 and 2 in a pre-actuated configuration and an actuated configuration.

In accordance with various embodiments, and with reference to FIGS. 1-3, a slider 100 is shown supported by a suspension 101 in close proximity to a rotating magnetic storage medium 160. The slider 100 supports a recording head transducer 103 and a heater 102 thermally coupled to the head transducer 103. The heater 102 may be a resistive heater that generates thermal heat as electrical current is passed through the heater 102. The heater 102 is not limited to resistive heaters, and may include any type of heating source. The thermal energy generated by the heater 102 causes thermal expansion of the head transducer 103. This thermal expansion can be used to reduce the head-media spacing 107 in a data storage system. It is noted that, in some embodiments, a non-thermal actuator can be used to reduce the head-media spacing 107.

A temperature sensor 105 is shown situated on the head transducer 103 at or near the close point. As discussed previously, actuation of the head transducer 103 can be realized by a thermal actuator, such as the heater 102, or other actuator (e.g., a writer). Bias power is applied to the temperature sensor 105 to raise the surface temperature of the sensor 105 and adjacent portion of the head transducer 103 to be substantially higher than the temperature of the magnetic recording medium 160.

The temperature sensor 105 is preferably configured to sense changes in heat flow for detecting onset of head-medium contact. Details concerning head-media spacing and contact determinations in accordance with various embodiments of the disclosure are provided in commonly owned U.S. patent application Ser. No. 12/941,461 filed Nov. 8, 2010 which is incorporated herein by reference.

As is depicted in FIG. 3, before head-media contact, there is an air gap 107 defined between the hot head surface and the relatively cool disk 160. The head transducer 103, air gap 107, and magnetic recording disk 160 define one level of heat transfer rate. When the head transducer 103 is in contact with the disk 160, such as after activation of the thermal actuator or heater 102, the direct contact between the high thermal conductivity materials of the head transducer 103 and the disk 160 significantly increases the heat transfer rate. As such, the temperature sensor 105 on the head transducer 103 senses a drop of temperature or an excursion of temperature trajectory, allowing for detection of head-media contact.

Figure 4A:
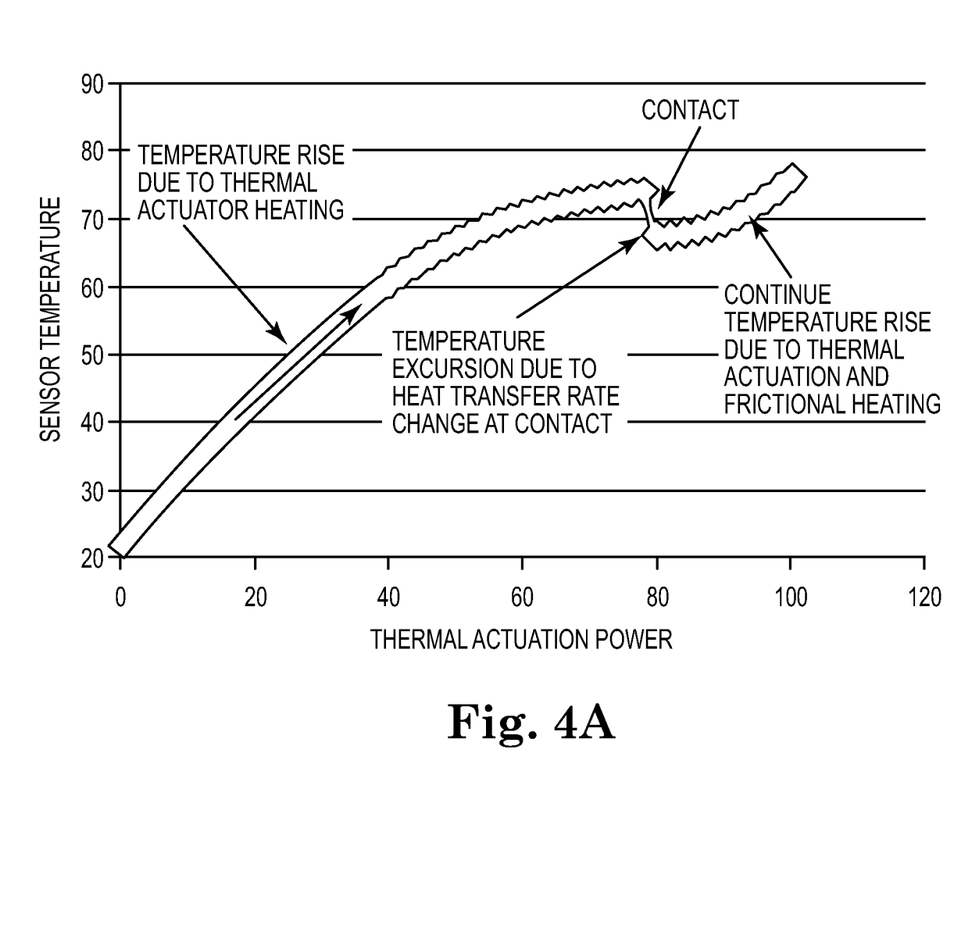
FIG. 4A illustrates a representative temperature profile for a heater-actuated recording head transducer of the type shown in FIGS. 1-3 before, during, and after contact between the head transducer and a surface of a magnetic recording disk.

FIG. 4A illustrates a representative temperature profile for a recording head transducer 103 of the type shown in FIGS. 1-3 before, during, and after contact between the head transducer 103 and a surface of the magnetic recording disk 160. In this illustrative example, the temperature profile is represented as a steady state DC signal due to the low- or non-modulation head-to-disk interface. When the head transducer 103 is actuated by a thermal actuator 102, the head transducer surface temperature will increase with the actuation due to the heat generated by the thermal actuator 102. The head transducer temperature will be higher than the temperature of the disk 160. As such, the disk 160 acts as a heat sink in this scenario. When the head transducer 103 contacts the disk 160, the head transducer surface temperature will drop due to a change in heat transfer rate resulting from the contact. The head transducer surface temperature will continue to increase due to thermal actuator heating and frictional heating. The change in temperature or excursion in temperature trajectory can be used to declare head-media contact.

Figure 4B:
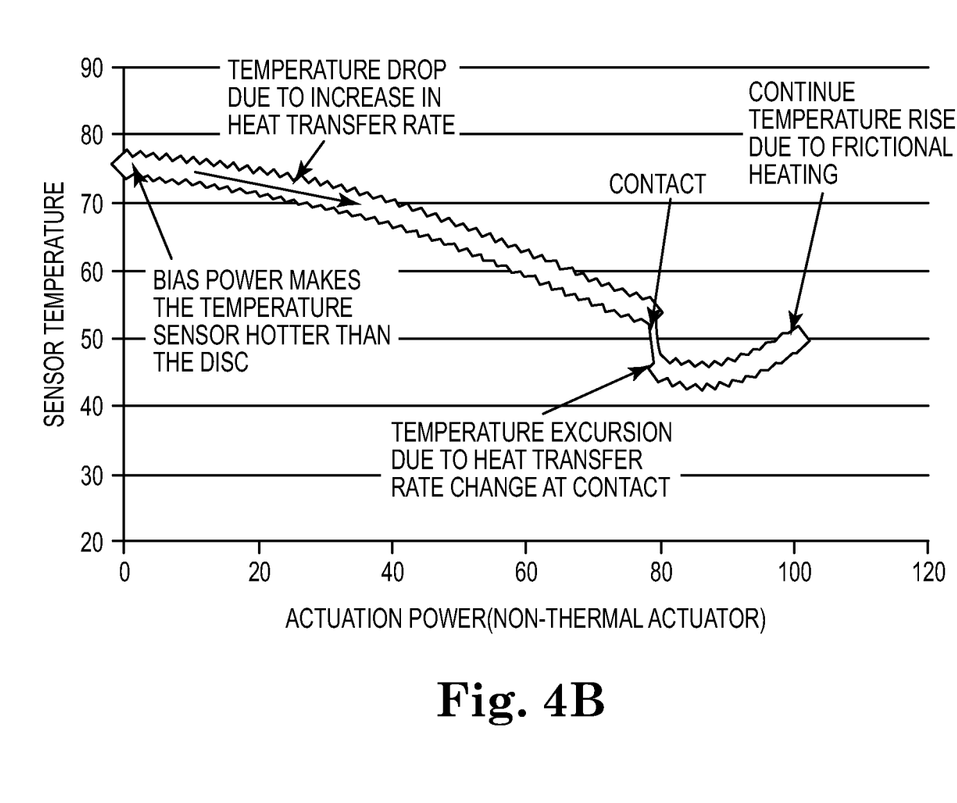
FIG. 4B illustrates a representative temperature profile for a non-thermal actuatable recording head transducer before, during, and after contact between the head transducer and a surface of a magnetic recording disk.

FIG. 4B illustrates a representative temperature profile for a recording head transducer 103 which is actuated by a non-thermal actuator. In this illustrative example, the temperature sensor 105 bias power self-heats the temperature sensor 105 to cause an increase in a temperature at the head-to-disk interface to be substantially higher than the temperature of the disk 160. The disk 160 acts as a heat sink in this scenario. When the head transducer 103 is actuated down toward the disk 160, the heat transfer rate increases gradually, causing a gradual decrease in the temperature of the sensor 105. When the head transducer 103 comes into contact with the disk 160, there will be a change in heat transfer rate, causing a head transducer surface temperature excursion. The temperature sensor 105 on the head transducer surface measures this temperature excursion to detect head-media contact. Should further actuation into head-media contact occur, the temperature will eventually increase due to frictional heating.

Figure 5:
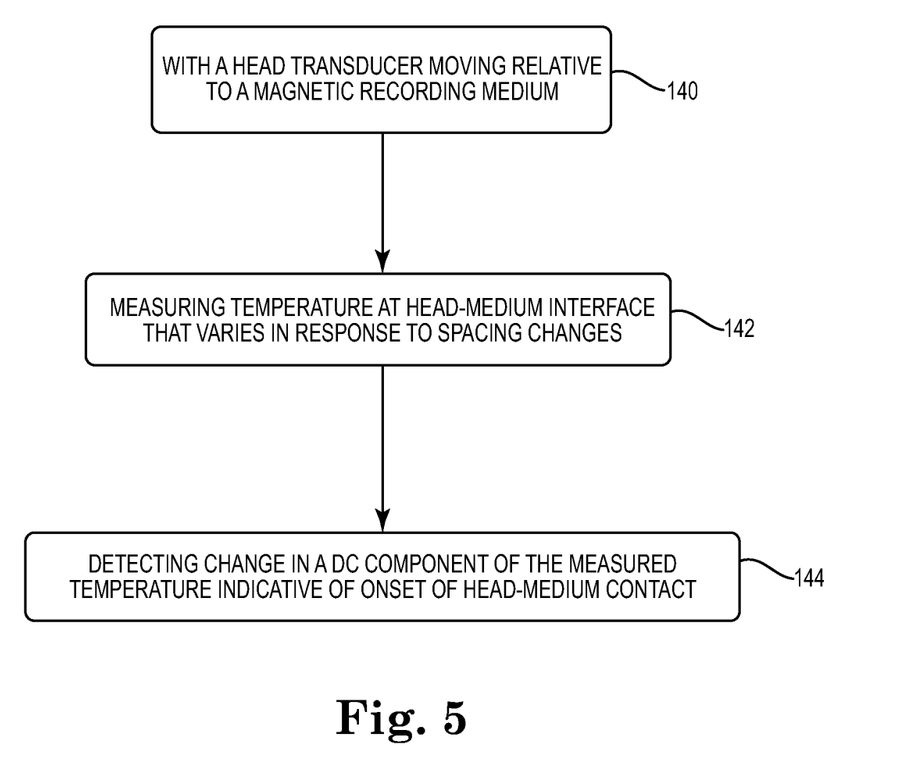
FIG. 5 illustrates various processes of a head-media contact methodology in accordance with various embodiments.

Turning now to FIG. 5, there is illustrated various processes of a head-media contact methodology in accordance with various embodiments. With the head transducer moving 140 relative to a magnetic recording media, the method illustrated in FIG. 5A involves measuring 142 temperature at a head-to-disk interface, the measured temperature varying in response to changes in spacing between the head transducer and the medium. The method also involves detecting 140 for a change in a DC component of the measured temperature indicative of onset of head-medium contact.

Figure 6:
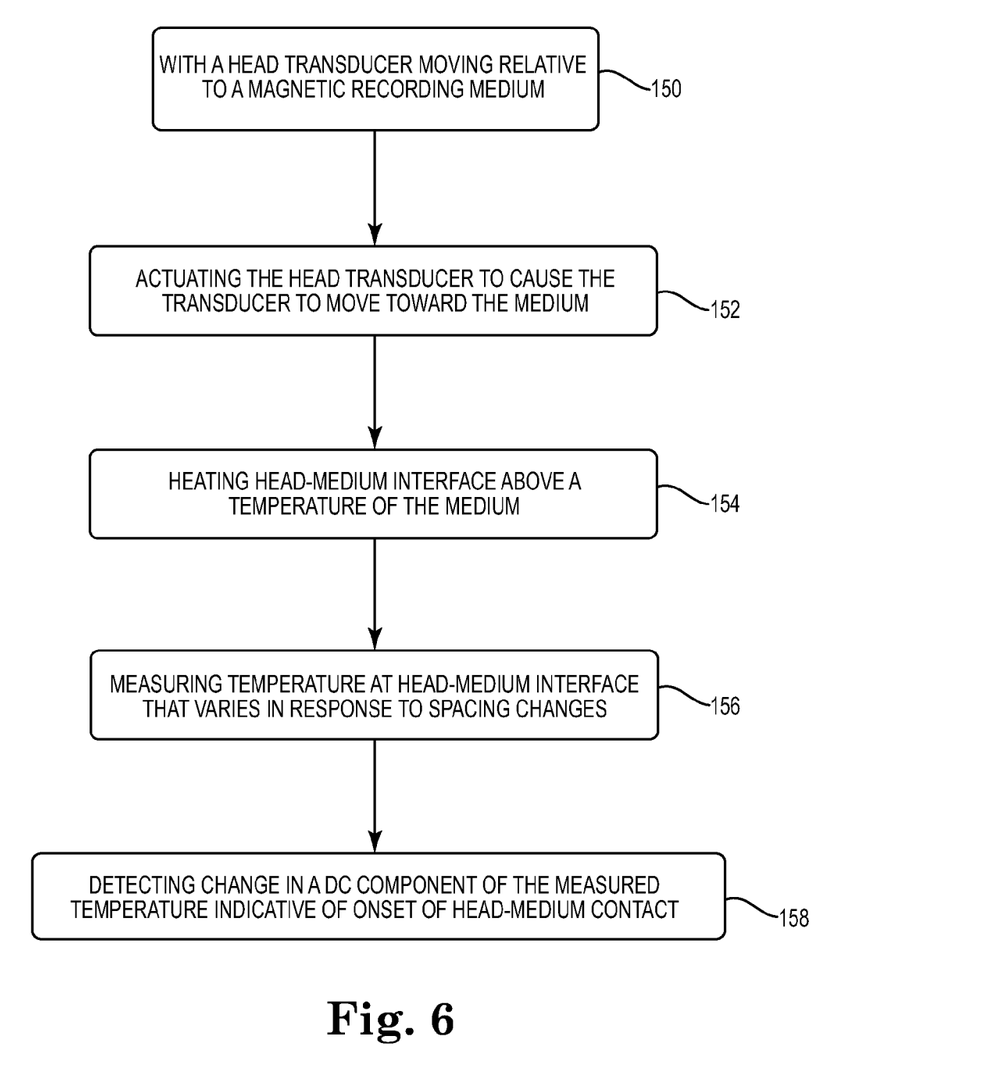
FIG. 6 shows various processes of a head-media contact methodology in accordance with other embodiments.

FIG. 6 shows various processes of a head-media contact methodology in accordance with other embodiments. With the head transducer moving 150 relative to a magnetic recording medium, the head transducer is actuated 150 to cause the transducer to move toward the medium. In some embodiments, the head transducer is actuated using a thermal actuator. In other embodiments, a non-thermal actuator is used to actuate the head transducer. The method shown in FIG. 6 also includes heating 154 the head-to-disk interface above the temperature of the medium. Preferably, the head-to-disk interface is significantly hotter than the temperature of the medium, such as between about 100° C. and 200° C. hotter (also see temperature ranges provided hereinabove).

With the head-to-disk interface heated, the temperature at the head-to-disk interface is measured 156, and changes in the interface temperature are measured by monitoring a DC component of the measured temperature. The method further involves detecting 158 a change in the DC component of the measured temperature indicative of onset of head-medium contact. In some embodiments, onset of head-medium contact can be detecting by measuring a percentage change in the DC component of the measured temperature and comparing this percentage change to a threshold. For example, a change in the DC component of about 1% can indicate onset of head-medium contact (e.g., a 1 Ohm shift for an 85 Ohm device is typical, which translates to about a 1.2% change in the DC component). In other embodiments onset of head-medium contact can be detected by detecting an excursion in a trajectory of the DC component of the measured temperature. For example, a trajectory deviation of greater than about 1% can be an indicator that onset of head-medium contact has occurred. Other detection approaches are contemplated, such as detecting changes representing a predetermined number of sigmas above a standard deviation of the DC component trajectory data.

Figure 7:
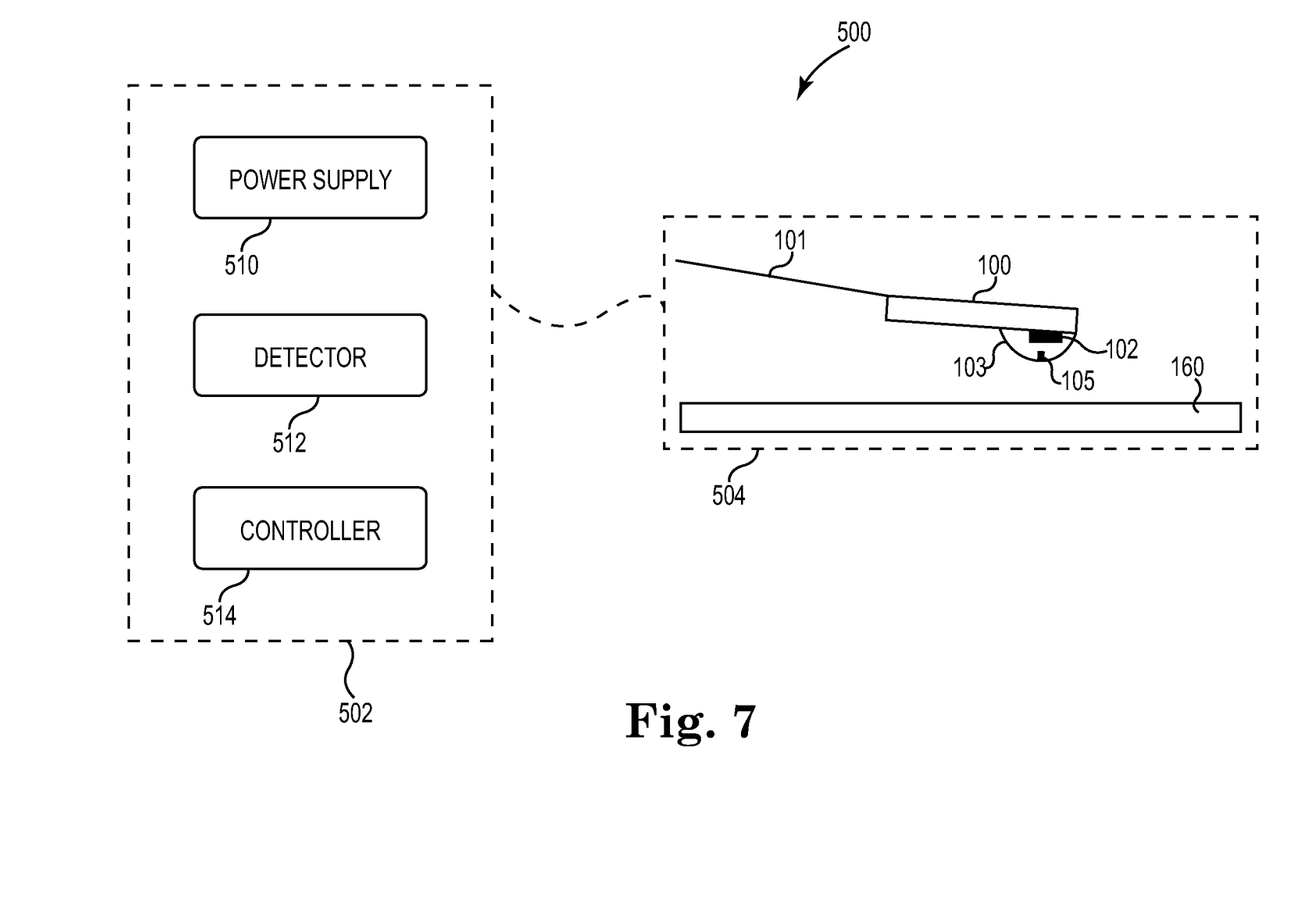
FIG. 7 shows an illustration of an apparatus for detecting head-media contact in accordance with various embodiments.

FIG. 7 shows an illustration of an apparatus 500 for detecting head-media contact in accordance with various embodiments. It is understood that numerous components of the apparatus 500 depicted illustrated in FIG. 7 are not shown for purposes of simplicity. The apparatus 500 shown in FIG. 7 depicts various components that can operate cooperatively to implement the various head-media contact methodologies described herein. In this illustration, a control system 502 is shown coupled to a mass storage device comprising any number of hard disk drives 504. FIG. 7 is a reproduction of the slider 100 shown in FIG. 1, which supports a recording head transducer 103 equipped with a temperature sensor 105, spaced apart from a surface of a rotating magnetic storage medium 160. The control system 502 is shown to include a controller 514, a detector 512, and a power supply 510. The controller 514 is configured to operate cooperatively with various components of the apparatus 500 to control the rotation of the medium 160 and the movement of the slider 100, such as during read and write operations. The power supply 510 provides power to various components of the apparatus 500. In the context of various embodiments, the power supply 510 is configured to provide bias power to the temperature sensor 105 and actuation power for the head transducer actuator. For example, the power supply 510 provides power to a heater 102 which operates as a thermal actuator for the head transducer 103.

The temperature sensor 105 is situated near or at a close point of the head transducer 105 and measures temperature at this location. The temperature sensor 105 is preferably a sensor having a temperature coefficient of resistance (TCR). The temperature sensor 105 may have a positive TCR or a negative TCR. Other types of temperature sensors 105 may be employed, such as a thermocouple or a thermistor, for example.

As discussed previously, the measured temperature varies in response to changes in spacing between the head transducer 103 and the magnetic recording medium 160. The detector 512 is coupled to the temperature sensor 105 and is configured to detect a change in the DC component of the measured temperature indicative of onset of contact between the head transducer 103 and the medium 160. Because the head-to-disk interface is a low- or non-modulation interface, a temperature signal produced by the temperature sensor 105 is substantially devoid of a varying signal component during head-medium contact. More particularly, the temperature signal is substantially devoid of an AC component during head-medium contact. Although there may be a small RMS component of the temperature signal, any such RMS component is not usable in the context of conventional contact detection schemes that rely on head-disk modulation.

According to some embodiments, power is supplied to the temperature sensor 105 by the power supply 510 to heat the head-to-disk interface to a temperature above a temperature of the medium 160. In other embodiments, the power supplied to both the temperature sensor 105 and the heater 102 by the power supply 510 to provide heating to the head-to-disk interface. The detector 512 is configured to detect changes in the DC component of a signal produced by the temperature sensor 105 indicative of an increased rate of heat transfer from the heated head-to-disk interface to the medium 160 in response to onset of contact between the head transducer 103 and the medium 160.

In magnetic recording, control of the clearance between the head and the media is important to successful reading and writing operations. Increasing areal density requires reduced head-to-media clearance. Media physical asperities can provide a lower limit to the mean head-to-media spacing by contacting the head and leading to abrasive wear of the head transducer structure and degradation of head electrical performance.

Asperities are isolated submicron-sized particles, typically comprising silicon carbide material, that are embedded in the disk substrate. Asperities are often large enough to interfere with the flight path of a typical slider/transducer assembly by impacting with the slider/transducer assembly at a very high velocity. Asperities arising from the surface of magnetic recording media are generally distributed in a highly random manner, and change in shape and size in response to changes in disk and ambient temperatures. A collision between a slider/transducer assembly and an asperity often renders the location of the asperity unusable for purposes of reading and writing information. Moreover, repeated contact between the slider/transducer assembly and asperity may cause damage of varying severity to the slider/transducer assembly.

Media asperity detection can be used to minimize head wear and degradation by mapping the media asperities to provide for a control algorithm for the head to avoid these sites on the media. As media asperities interact with the head, they provide for a time varying temperature distribution on the head. This time varying temperature signature can be detected by monitoring the electrical resistance of a device with a TCR sensor element. Embodiments of the disclosure provide for a high fidelity media asperity detection sensor. Embodiments of the disclosure provide for a high fidelity TCR sensing device for detecting media asperities to reduce head mean spacing (HMS) and increase areal density.

According to various embodiments, a resistance temperature sensor includes a sensor element situated on a head transducer and configured to detect media asperities. The sensor element is preferably formed from a material having a high temperature coefficient of resistance. Electrical connection to the sensing element is provided by conductive leads comprising a material with a low temperature coefficient of resistance relative to that of the sensor element. The conductive leads are preferably formed from a material with a near-zero temperature coefficient of resistance. Among other benefits, a resistance temperature sensor of the present disclosure provides for enhanced contact detection. During media defect scans, for example, the head-medium clearance, and therefore heater power, is fixed, meaning that the resulting thermal background is fixed. During contact detection, however, the heater is being ramped, hence the low TCR leads of the present disclosure find particular utility in contact detection applications.

Figures 8A, 8B, 8C:
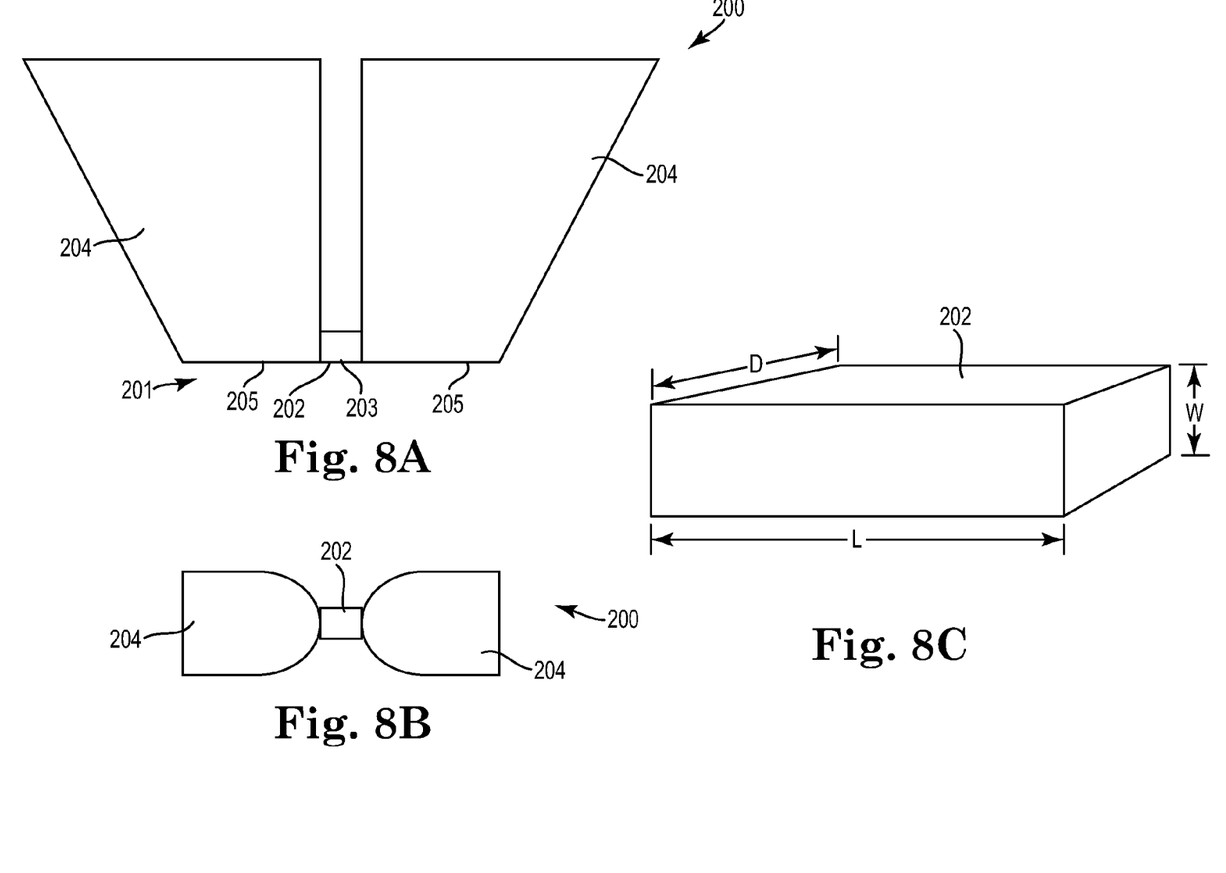
FIGS. 8A and 8B illustrate a resistance temperature sensor in accordance with various embodiments.
FIG. 8C is an exploded view of the sensor element shown in FIGS. 8A and 8B.

FIGS. 8A and 8B illustrate a resistance temperature sensor 200 in accordance with various embodiments. FIG. 8A shows a plan view of the resistance temperature sensor 200. FIG. 8B is an airbearing surface view of the resistance temperature sensor 200 shown in FIG. 8A. The resistance temperature sensor 200 includes a sensor element 202 connected to a pair of leads 204. A surface 203 of the sensor element 202 is shown in FIG. 8A being aligned approximately parallel with an airbearing surface (ABS) 205 of the head transducer, where the temperature gradient between the head transducer and the magnetic recording medium is largest. Therefore, a larger change of resistance in the sensor element 202 will be accompanied with ABS surface temperature changes as compared to a conventional design that has much more TCR material located into the slider body, shielded from the ABS surface.

The sensor element 202 is sensitive to changes in heat flow across a small sensing area relative to that of a typical head-media contact sensor, for example. Accordingly, the sensor element 202 has greater sensitivity to changes in heat flow for detecting asperities of the magnetic recording medium. It is noted that a typical head-media contact sensor is sensitive to changes in heat flow across a large sensing area relative to that of the sensor element 202.

FIG. 8C is an exploded view of the sensor element 202 shown in FIGS. 8A and 8B. In FIG. 8C, the sensor element 202 is shown to have a cross-track length (L), an into-slider body depth (D), and a down track width (W). According to some embodiments, the sensor element 202 may have the following geometry: L=750 nm; D=75 nm; and H=60 nm. In other embodiments, the sensor element 202 may have the following geometry: L=750 nm; D=85 nm; and H=40 nm. It is understood that the configuration and geometry of the sensor element 202 shown in FIG. 8C is for non-limiting illustrative purposes. The relatively small sensor element 202 is able to determine the geometry of a small asperity for accurate track padding, for example.

Figure 9:
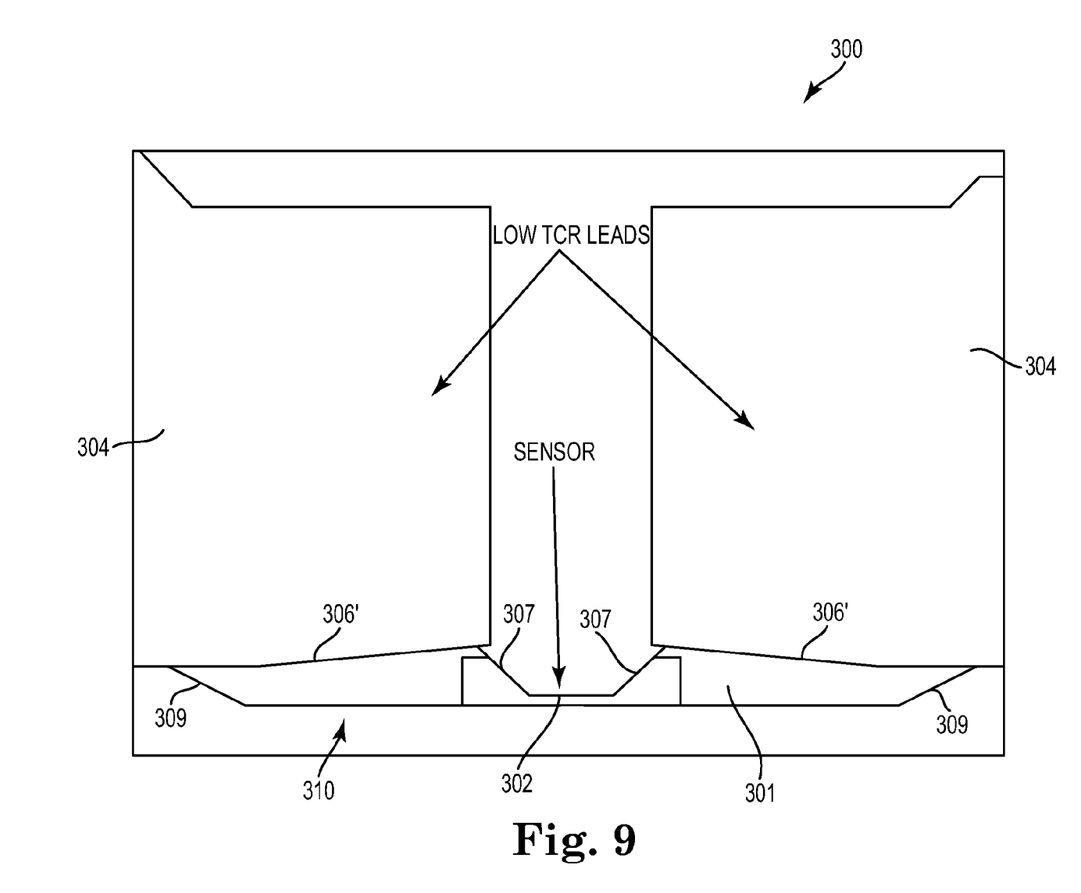
FIG. 9 is a plan view of a resistance temperature sensor having improved asperity detection fidelity in accordance with various embodiments.

FIG. 9 is a plan view of a resistance temperature sensor 300 having improved media defect detection fidelity in accordance with various embodiments. In the embodiment shown in FIG. 9, the resistance temperature sensor 300 includes a sensor arrangement 301 having a significant length dimension parallel to an airbearing surface 310 of the head transducer. The sensor arrangement 301 of the resistance temperature sensor 300 shown in FIG. 9 has a significant amount of TCR material situated on the airbearing surface 310. An appreciable portion of the sensor arrangement 301 extends along a surface 306' of each lead 304. The sensor arrangement 301 has a relatively thin section located in a gap between the two leads 304 that defines a sensor element 302.

The sensor element 302 has a generally "gull wing" shape, with the sensor element 302 located at a central location of the sensor arrangement 301. The sensor arrangement 301 includes tapered regions 307 on opposing ends of the sensor element 302. Opposing end regions of the sensor arrangement 301 have tapered regions 309 that terminate at a surface of the leads 306 which is parallel to the airbearing surface 310. The gull wing shape of the sensor element 302 of FIG. 9 enables lead material to be kept off the airbearing surface. This enables materials to be chosen that might not be acceptable at the ABS from a surface finish and/or corrosion robustness standpoint. Limiting the number of materials exposed at the ABS makes pole tip protrusion related aspects of the surface finish to be more easily managed.

According to various embodiments, the temperature of the sensor elements 202 and 302 shown in FIGS. 8A-9 can be controlled by changing the bias power of the sensor system (i.e., current, power, or voltage), such as by controlling the power supply 510 shown in FIG. 7. When operating in an asperity detection mode, for example, a relatively large bias current can be used to significantly heat up the sensor elements 202 and 302 to a temperature above ambient (i.e., above the disk temperature). For example, the sensor elements 202 and 302 may comprise a TCR wire or structure that is operated at a temperature of ~100° C., for example, above the head transducer temperature, which provides for a good signal-to-noise ratio (SNR). In some embodiments, a TCR wire or structure of the sensor elements 202 and 302 can be operated at a temperature of up to ~200° C. above the head transducer temperature, for example. It is understood that the operating temperature of a TCR wire or structure of the sensor elements 202 and 302 can vary from those provided above based on the TCR materials used.

As was previously discussed, the leads 202 and 302 preferably comprise low or near-zero TCR material, which provides for improved media defect detection fidelity by reducing noise due to thermally induced resistance change in the leads 204 and 304. As shown in FIGS. 8A-9, a TCR-based asperity sensor element 202, 302 is preferably located nearest the airbearing surface 201, 310 to provide maximal interaction with media asperities. Suitable sensor TCR materials include NiFe, Ni, Ru, Cr and other materials that have relatively high TCR. The leads 202, 302 connecting to the sensor elements 202, 302 of the TCR-based sensor 200, 300 is provided by conductive leads comprising a material with a relatively low or near-zero TCR, such as NiCu alloys.

A combined structure of a high TCR sensing element 202, 302 and low TCR contacts 204, 304 provides a response to media asperities that is not confounded by temperature induced resistance changes in the leads 204, 304. The temperature induced resistance changes in the leads 204, 304 provide for additional noise and reduction in asperity detection SNR. The low or near-zero TCR lead material provides for a higher fidelity resistance temperature sensor 200, 300 to detect media asperities and provides for reduced head mean spacing and an increased areal density capability.

Figure 10:
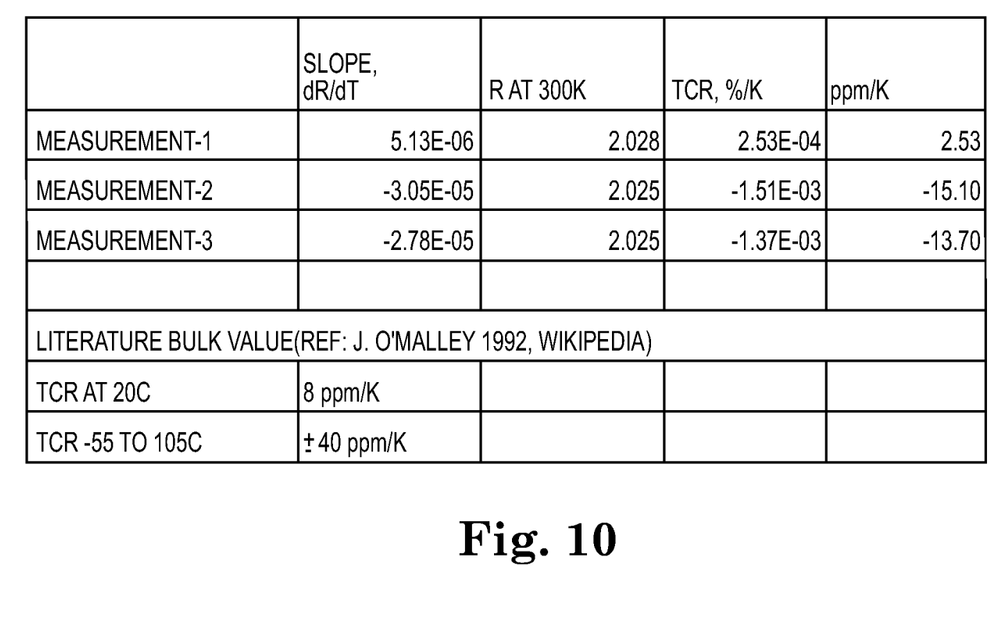
FIGS. 10 and 11 provide data and plots that demonstrate the efficacy of a particular temperature coefficient of resistance material suitable for use in a sensing element of a resistance temperature sensor according to various embodiments.
Figure 11:
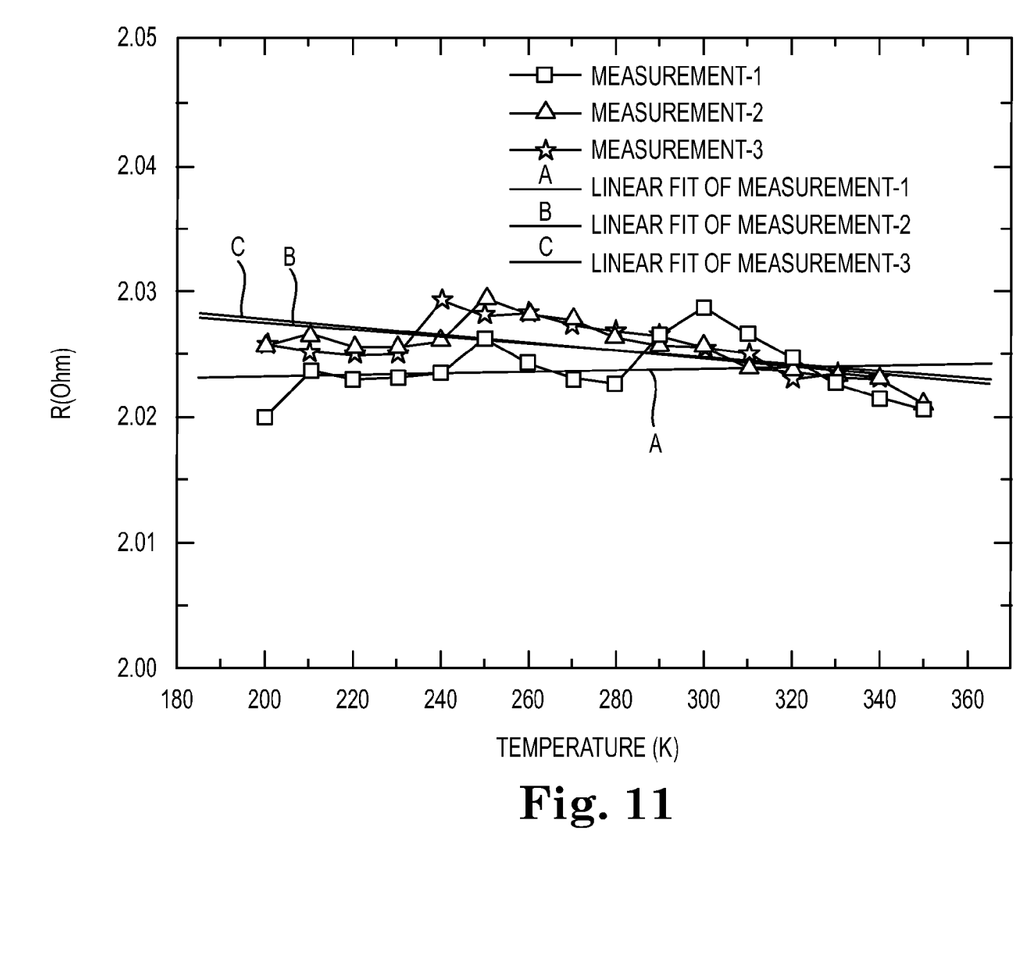

FIGS. 10 and 11 provide data and plots that demonstrate the efficacy of a particular TCR material suitable for use in the TCR sensing elements 202, 302 according to various embodiments. The data and plots shown in FIGS. 10 and 11 demonstrate that a NiCu50% alloy film having a thickness of 100 nm is a low or near-zero TCR material well suited for use in forming the leads 204, 304 of the TCR-based sensors 200, 300 shown in FIGS. 8A-9.

It is to be understood that even though numerous characteristics of various embodiments have been set forth in the foregoing description, together with details of the structure and function of various embodiments, this detailed description is illustrative only, and changes may be made in detail, especially in matters of structure and arrangements of parts illustrated by the various embodiments to the full extent indicated by the broad general meaning of the terms in which the appended claims are expressed.

What is claimed is:

1. An apparatus, comprising:
a head transducer; and
a sensor situated on the head transducer to interact with asperities of a magnetic recording medium, the sensor comprising:
a sensing element having a high temperature coefficient of resistance; and
electrically conductive leads connected to the sensing element, the leads having a low temperature coefficient of resistance relative to that of the sensing element such that thermally induced resistance changes in the leads have a negligible effect on a response of the sensing element to asperities.

2. The apparatus of claim 1, wherein the response of the sensing element to asperities is not confounded by temperature induced resistance changes in the leads.

3. The apparatus of claim 1, wherein the leads are formed of a material having a near-zero temperature coefficient of resistance.

4. The apparatus of claim 1, wherein the leads comprise a NiCu alloy film.

5. The apparatus of claim 1, wherein the leads comprise a NiCu50% alloy film having a thickness of about 100 nm.

6. The apparatus of claim 1, wherein the sensing element is formed of a material comprising NiFe, Ni, Ru or Cr.

7. The apparatus of claim 1, further comprising a detector coupled to the sensor and configured to detect asperities.

8. A method, comprising:
moving a magnetic recording medium relative to a head transducer:
sensing for asperities of the medium using a sensor comprising a sensing element having a high temperature coefficient of resistance coupled to electrically conductive leads having a low temperature coefficient of resistance relative to that of the sensing element such that thermally induced resistance changes in the leads have a negligible effect on a response of the sensing element to asperities.

9. The method of claim 8, wherein leads are formed of a material having a near-zero temperature coefficient of resistance.

10. An apparatus, comprising:
a slider that supports a transducer configured to interact with a magnetic recording medium, the slider comprising an airbearing surface; and
a sensor situated on the slider and configured to sense asperities of the medium, the sensor comprising:
a sensing element disposed at or proximate the airbearing surface and having a high temperature coefficient of resistance; and
a lead arrangement electrically connected to the sensing element, the lead arrangement having a low temperature coefficient of resistance relative to that of the sensing element such that thermally induced resistance changes in the lead arrangement have a negligible effect on a response of the sensing element to asperities.

11. The apparatus of claim 10, wherein the sensing element has a longitudinal axis aligned approximately parallel with the airbearing surface.

12. The apparatus of claim 10, wherein:
the sensing element has a cross-track length (L), an into-slider body depth (D), and a down track width (W); and
the cross-track length (L) is greater than the into-slider body depth (D) by a factor of at least about 8.

13. The apparatus of claim 10, wherein the sensing element has a generally gull wing shape.

14. The apparatus of claim 10, wherein:
the lead arrangement comprises:
a first lead connected to a first distal portion of the sensing element; and
a second lead connected to a second distal portion of the sensing element; and
the first and second distal portions of the sensing element are disposed between the airbearing surface and at least a portion of the first and second leads.

15. The apparatus of claim 10, wherein:
the lead arrangement comprises:
a first lead connected to a first distal portion of the sensing element; and
a second lead connected to a second distal portion of the sensing element;
the sensing element comprises a thinned section between the first and second distal portions; and
the thinned section of the sensing element is situated within a gap between the first and second leads.

16. The apparatus of claim 10, wherein leads of the lead arrangement are formed of a material having a zero or near-zero temperature coefficient of resistance.

17. The apparatus of claim 10, wherein leads of the lead arrangement comprise a NiCu alloy film.

18. The apparatus of claim 10, wherein leads of the lead arrangement comprise a NiCu50% alloy film having a thickness of about 100 nm.

19. The apparatus of claim 10, wherein the sensing element is formed of a material comprising NiFe, Ni, Ru or Cr.

20. The apparatus of claim 10, further comprising a detector coupled to the sensor and configured to detect asperities.

21. The apparatus of claim 10, wherein leads of the lead arrangement have a resistivity greater than a resistivity of the sensor.

22. The apparatus of claim 10, wherein leads of the lead arrangement have a resistivity greater than a resistivity of the sensor.

* * * * *